United States Patent [19]

Freedman et al.

[11] 3,892,533
[45] July 1, 1975

[54] OXYGENATOR GAS DISTRIBUTION HEADER

[75] Inventors: Frank B. Freedman, St. Louis Park; Keith A. Ufford, Osseo, both of Minn.

[73] Assignee: Sci-Med, Inc., Minneapolis, Minn.

[22] Filed: Mar. 2, 1973

[21] Appl. No.: 337,677

[52] U.S. Cl. ............ 23/258.5; 55/158; 128/DIG. 3; 210/321; 210/494
[51] Int. Cl. ............................................ A61m 1/03
[58] Field of Search ...... 23/258.5; 55/158; 210/321, 210/494; 128/DIG. 3

[56] References Cited
UNITED STATES PATENTS

| | | | |
|---|---|---|---|
| 3,171,475 | 3/1965 | Waldman | 23/258.5 UX |
| 3,332,746 | 7/1967 | Claff et al. | 23/258.5 |
| 3,489,647 | 1/1970 | Kolobow | 23/258.5 |
| 3,505,686 | 4/1970 | Bodell | 23/258.5 X |
| 3,738,813 | 6/1973 | Esmond | 23/258.5 |
| 3,741,395 | 6/1973 | Zimmerman | 210/494 X |
| 3,784,470 | 1/1974 | Richardson et al. | 210/494 X |
| 3,792,978 | 2/1974 | Freedman | 23/258.5 |
| 3,794,468 | 2/1974 | Leonard | 23/258.5 |

FOREIGN PATENTS OR APPLICATIONS

| | | | |
|---|---|---|---|
| 1,527,944 | 6/1968 | France | 210/321 |

*Primary Examiner*—Barry S. Richman
*Attorney, Agent, or Firm*—Walter N. Kirn, Jr.

[57] ABSTRACT

A spool wound membrane oxygenator or artificial lung. The oxygenator includes a membrane envelope assembly wound around a core of a plastic spool with the principle of gas diffusion through a membrane being utilized. Each disk shaped end plate of the spool is provided with aperture means for blood carrying tubing and aperture means for gas carrying tubing. The oxygen and blood inlet and outlet means are so disposed as to provide a substantially countercurrent flow pattern of oxygen and blood through the mass transfer section of the oxygenator.

2 Claims, 4 Drawing Figures

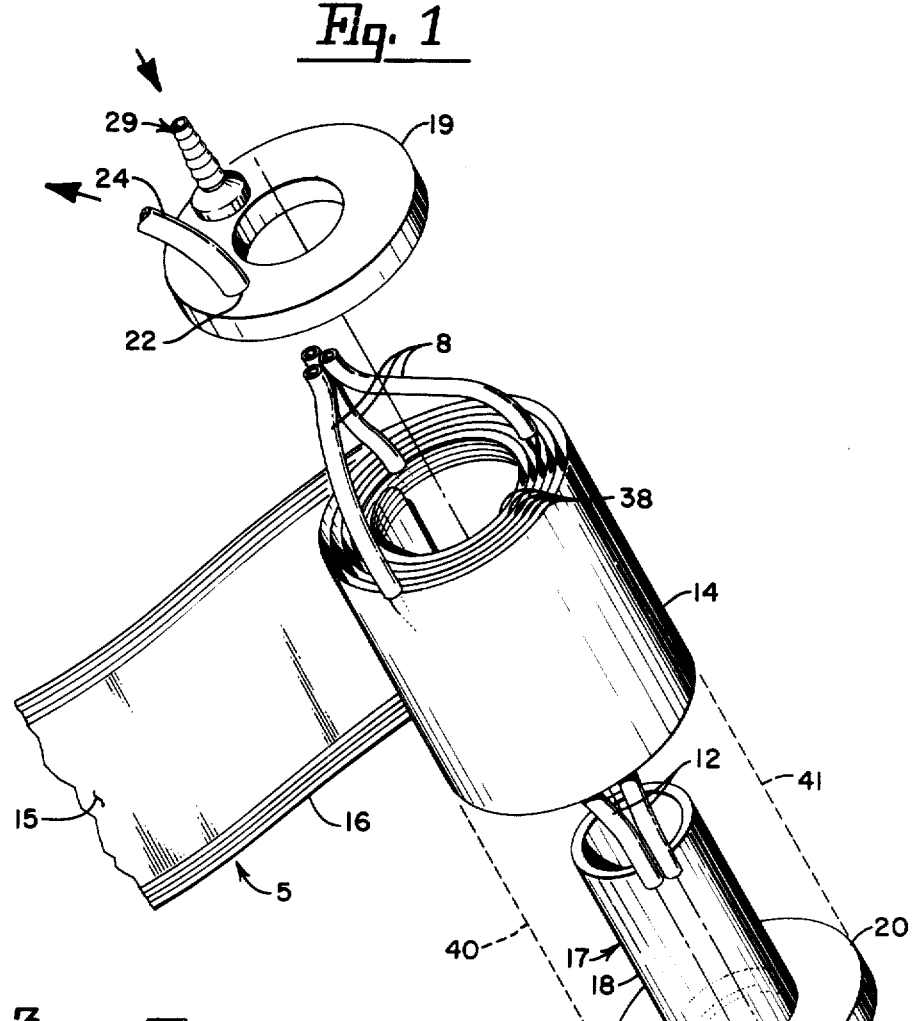
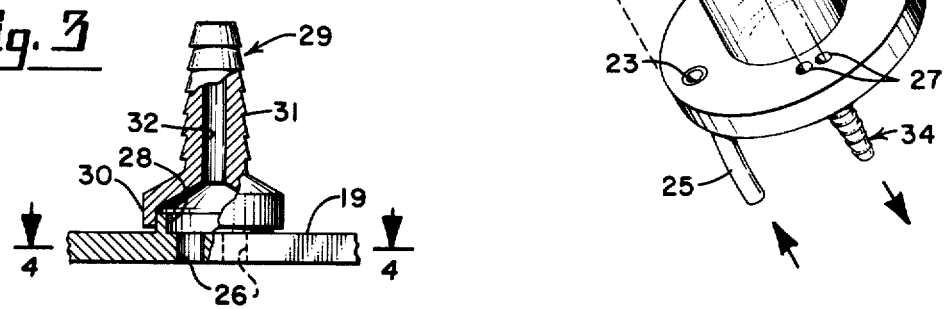
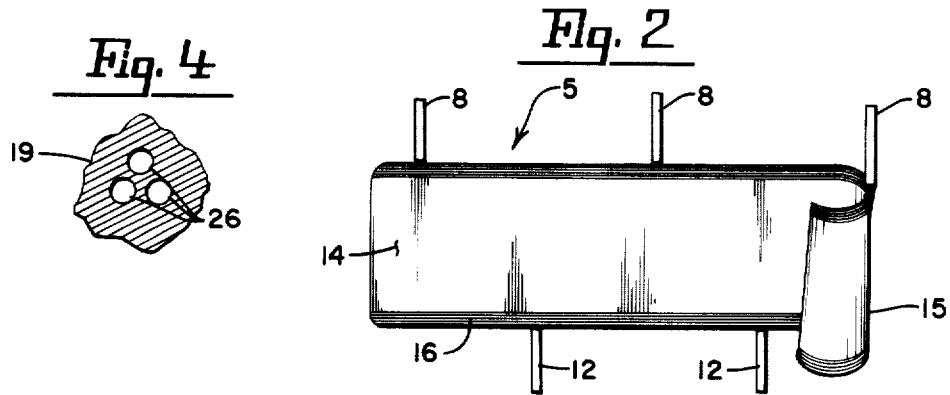

OXYGENATOR GAS DISTRIBUTION HEADER

The invention relates to a new and improved artificial lung which may also be referred to as an oxygenator.

A spool wound artificial oxygenator as referred to above is disclosed in U.S. Pat. No. 3,489,647 to Theodor Kolobow titled, "Artificial Organ for Membrane Dialysis of Biological Fluids." The oxygenator includes a membrane envelope assembly wound around a core of a plastic spool and the principle of gas diffusion through a membrane is utilized. Each end plate of the spool is provided with aperture means to facilitate the attachment of blood carrying and gas carrying tubing.

An object of the invention is to provide a new and improved artificial lung or oxygenator assembly.

Other objects of the invention will become apparent from the following specification, drawing and appended claims.

In the drawing:

FIG. 1 is an exploded perspective view of a spool type membrane oxygenator assembly, or artificial lung assembly, which embodies the invention;

FIG. 2 shows a membrane envelope assembly.

FIG. 3 is a fragmentary view, partially in section, of one of the end disk plates showing aperture means for gas carrying tubing; and FIG. 4 is a sectional view taken on line 4—4 of FIG. 3.

In the drawing, there is shown a spool type membrane oxygenator assembly having an envelope 5 with attached upper and lower gas inlet and outlet tubes 8 and 12. The construction of each tube and its manner of attachment to the envelope is the subject of applicant's patent application Ser. No. 257,537, filed May 30, 1972 and titled "Envelope Assembly for Spool Type Oxygenator." The tubes 8 and 12 are identical to each other and either one may function as a gas inlet tube or a gas outlet tube.

The envelope assembly comprises a pair of rectangularly shaped membrane sheets 14 and 15 made of a gas permeable material such as silicone rubber, Teflon or polypropylene. These sheets have a thickness on the order of 1 to 5 mils.

Within the space bounded by the sealed edges of the envelope formed by the sheets 14 and 15 is sandwiched a spacer screen (not shown) which may be of any suitable material such as fiberglass, Saran or nylon and have a thickness on the order of 0.030 inch. The spacer screen functions to maintain a desired spacing between the membrane sheets 14 and 15 to provide a gas chamber which resists collapsing when the external pressure on the sheets 14 and 15 is greater than the internal pressure.

Tubes 8 and 12 are made of silicon rubber or the like and are provided for admitting and exhausting gaseous fluids to and from the enclosed space between membrane sheets 14 and 15 which forms an enclosed chamber as stated above.

The envelope 5 is intended to be wound around the core of an oxygenator spool as illustrated in FIGS. 1 and 2 of the above referred to Kolobow patent. As illustrated in the drawing of this application, a spool 17 is shown which comprises a cylindrically shaped core 18 having disk shaped end plates 19 and 20 attached or attachable to opposite ends of the core 18. Spool 17 is made of a plastic or other suitable material. Disk 19 is actually attached to core 18 in practice and is shown separated therefrom only for the sake of the exploded drawing technique.

Envelope 5 is wound around the core 18. End plates 19 and 20 are provided with tube ports 22 and 23 respectively to which are attached plastic tubes 24 and 25. End plates 19 and 20 are also provided with apertures 26 and 27 respectively through which the tubes 8 and 12 are threaded, respectively, the tubes having diameters relative to these apertures so that fluid tight fits are achieved. Three holes 26 are provided in plate 19 to accommodate the three tubes 8 and two holes 27 are provided in plate 20 to accommodate the two tubes 12. As shown in FIG. 3, plate 19 has a collar 28 surrounding the holes 26. A tube connector 29 has a flange 30 which surrounds and engages the collar 28. The upper portion of connector 29 has a narrow stem portion 31 having a central bore 32 and a serrated outer surface to facilitate the attachment of a tube (not shown) in surrounding relation thereto.

A tube connector 34 is provided for plate 20 which is identical to tube connector 29. Although not shown, plate 20 has a collar extending downwardly therefrom in surrounding relation to the holes 27 and such collar bears exactly the same relationship to plate 20 and the holes 27 that collar 28 bears to plate 19 and the holes 26 thereof. Tube connector 34 attaches to the collar (not shown) of plate 20 in the same manner that tube connector 29 attaches to flange 28.

Plastic tubes (not shown) are attachable to the connectors 29 and 34 to facilitate supplying oxygen through connector 29 and the withdrawal of carbon dioxide through connector 34.

Envelope 5, when wound around core 18, forms a spirally extending space 38 and, in the use of the oxygenator, the space 38 forms a path for the blood to pass in an upward direction. Dashed lines 40 and 41 indicate an outer casing which is not shown but would surroundingly enclose the wound envelope 5 and be flush with the circumferences of the end plates 19 and 20. Such a casing could take various forms and is not of any special interest herein. The spiral space enclosed within the envelope 5 forms a path for the transfer of gas in a spiralling downward direction with oxygen entering the space through tubes 8 and with carbon dioxide and other exhaust gases being withdrawn from the space through the tubes 12.

In assembling the oxygenator the envelope assembly 5 is wound around the core 18. The ends of tubes 8 are force fitted in the plate holes 26 and the ends of the tubes 12 are force fitted in the plate holes 27. Plates 19 and 20 are attached to the core 18 and the tube connectors 29 and 34 are respectively attached, as by cementing, to the collars of the plates 19 and 20.

It will be appreciated that the space in which a coiled envelope 5 is installed or disposed has a fixed volume defined by the casing of the oxygenator, this casing being indicated by the dashed lines 40 and 41. This fixed volume space is in a sense, or in effect, divided into two primary spaces which are the spiral gas chamber of the envelope 5 and the spiral blood chamber 38. In operation the oxygenator is mounted in a position that is inclined relative to the vertical as indicated in the drawing. After the oxygenator is mounted in this position the tubes 24 and 25 are connected to other components of an artificial heart lung machine which is not shown.

We claim:

1. A blood oxygenator assembly comprising a spool having a cylindrically shaped core with upper and lower disk shaped end plates at opposite ends thereof, an elongated rectangularly shaped envelope made of gas permeable membrane sheets and defining an enclosed space, inlet and outlet tubing means attached to said envelope for conveying gas to, from and within said enclosed space substantially in one direction, said envelope being spirally wound on said core to define a second space for the flow of blood between adjacent turns of said spirally wound envelope, said end plates each having a port communicating with said second space to which blood carrying tubing may be attached for conveying blood to, from and within said second space in a direction substantially countercurrent to said first-mentioned direction, aperture means in said end plates through which said inlet and outlet tubing extends, said aperture means in each of said end plates including a set of at least two holes, each of said end plates having a collar extending therefrom in surrounding relation to the set of said holes therein, and tubing connector means attached to each of said collars.

2. A blood oxygenator assembly according to claim 1 wherein the holes of each of said sets are in closely spaced relation.

* * * * *